US012638716B2

(12) United States Patent
Jung et al.

(10) Patent No.: US 12,638,716 B2
(45) Date of Patent: May 26, 2026

(54) LIQUID CRYSTAL DISPLAY APPARATUS

(71) Applicant: SAMSUNG SDI CO., LTD., Yongin-si (KR)

(72) Inventors: Yong Un Jung, Suwon-si (KR); So Yeon Gong, Suwon-si (KR); Jeong Ho Lee, Suwon-si (KR); Hyun Wook Kim, Suwon-si (KR); Dong Ho Wee, Suwon-si (KR); Young Oh, Suwon-si (KR); Young Hyun Ju, Suwon-si (KR)

(73) Assignee: Wuxi Hengxin Optoelectronic Materials Co., Ltd., Wuxi (CN)

(*) Notice: Subject to any disclaimer, the term of this patent is extended or adjusted under 35 U.S.C. 154(b) by 0 days.

(21) Appl. No.: 18/173,647

(22) Filed: Feb. 23, 2023

(65) Prior Publication Data

US 2023/0273477 A1 Aug. 31, 2023

(30) Foreign Application Priority Data

Feb. 25, 2022 (KR) ........................ 10-2022-0025062

(51) Int. Cl.
G02F 1/1335 (2006.01)
(52) U.S. Cl.
CPC .. G02F 1/133538 (2021.01); G02F 1/133531 (2021.01); *G02F 2202/023* (2013.01)
(58) Field of Classification Search
CPC ......... G02F 1/133538; G02F 1/133531; G02F 2202/023
USPC .......................................... 349/112, 117–121
See application file for complete search history.

(56) References Cited

U.S. PATENT DOCUMENTS

| | | | |
|---|---|---|---|
| 2006/0014085 A1 | 1/2006 | Nakajima et al. | |
| 2007/0052931 A1* | 3/2007 | Kanatani .............. | G02B 6/0053 |
| | | | 353/69 |
| 2008/0303777 A1* | 12/2008 | Inoue ................... | G02B 3/0056 |
| | | | 345/102 |
| 2009/0290102 A1 | 11/2009 | Amimori et al. | |
| 2015/0168780 A1* | 6/2015 | Ohno ............... | G02F 1/133634 |
| | | | 349/61 |
| 2015/0185557 A1* | 7/2015 | Sung ................. | G02F 1/133528 |
| | | | 349/62 |

(Continued)

FOREIGN PATENT DOCUMENTS

| | | | |
|---|---|---|---|
| CN | 101305303 A | 11/2008 | |
| CN | 101910875 A * | 12/2010 | ............. B29C 47/52 |

(Continued)

OTHER PUBLICATIONS

PE2E English translation of CN101910875A (Year: 2010).*

(Continued)

*Primary Examiner* — David Y Chung
(74) *Attorney, Agent, or Firm* — Ricky Lam

(57) ABSTRACT

A liquid crystal display apparatus includes a liquid crystal panel; a viewer-side polarizing plate stacked on a light exit surface of the liquid crystal panel; and a first optical sheet and a second optical sheet sequentially stacked on a light incidence surface of the liquid crystal panel, and the viewer-side polarizing plate includes a polarizer and a contrast ratio or viewing angle-enhancing layer; the liquid crystal panel has a horizontal direction corresponding to a long side thereof and a vertical direction corresponding to a short side thereof; and the first optical sheet has a plurality of first optical patterns on a light exit surface thereof, an angle of a longitudinal direction of the first optical patterns relative to the vertical direction of the liquid crystal panel being from −10° to +10°.

19 Claims, 6 Drawing Sheets

(56)  References Cited

U.S. PATENT DOCUMENTS

| | | | |
|---|---|---|---|
| 2015/0227004 A1* | 8/2015 | Cho | G02F 1/133707 |
| | | | 349/110 |
| 2015/0346563 A1* | 12/2015 | Kurokawa | G02F 1/133606 |
| | | | 349/57 |
| 2016/0116646 A1* | 4/2016 | Araki | G02B 6/0011 |
| | | | 349/112 |
| 2016/0187699 A1 | 6/2016 | Ju et al. | |
| 2020/0073172 A1 | 3/2020 | Wee et al. | |
| 2020/0123854 A1 | 4/2020 | Oh et al. | |
| 2020/0159068 A1* | 5/2020 | Lee | G02F 1/133528 |
| 2020/0233145 A1 | 7/2020 | Yagi et al. | |
| 2022/0270778 A1* | 8/2022 | Ishikawa | G02F 1/1337 |

FOREIGN PATENT DOCUMENTS

| | | |
|---|---|---|
| CN | 105739163 A | 7/2016 |
| KR | 10-2005-0074610 | 7/2005 |
| KR | 10-2010-0056984 | 5/2010 |
| KR | 10-2015-0062758 A | 6/2015 |
| KR | 10-2018-0047569 A | 5/2018 |
| KR | 10-2018-0126876 A | 11/2018 |
| TW | 201626071 A | 7/2016 |
| TW | 201841031 A | 11/2018 |

OTHER PUBLICATIONS

Taiwanese Office Action dated Dec. 8, 2023 issued in Taiwanese Patent Application No. 112106750 (7 pages).
Korean Office Action dated Aug. 9, 2024, issued in corresponding Korean Patent Application No. 10-2022-0025062 (7 pages).
Taiwanese Office Action dated Jan. 15, 2025, issued in corresponding Taiwanese Patent Application No. 112106750 (9 pages).
Chinese Office Action dated Jun. 25, 2025, issued in corresponding Chinese Patent Application No. 202310158163.1 (8 pages).

* cited by examiner

LIQUID CRYSTAL DISPLAY APPARATUS

CROSS-REFERENCE TO RELATED APPLICATION

This application claims priority to and the benefit of Korean Patent Application No. 10-2022-0025062, filed on Feb. 25, 2022 in the Korean Intellectual Property Office, the entire disclosure of which is incorporated herein by reference.

BACKGROUND

1. Field

Aspects of embodiments of the present invention relate to a liquid crystal display apparatus.

2. Description of the Related Art

In operation of a liquid crystal display apparatus, light emitted from a backlight unit is discharged through a liquid crystal panel. Accordingly, a screen of the liquid crystal display apparatus has a good contrast ratio (CR) at a front side thereof. However, the screen of the liquid crystal display apparatus has a lower contrast ratio at a lateral side than at the front side. Accordingly, a film having a predetermined pattern is suggested to improve the contrast ratio and viewing angle.

The liquid crystal display apparatus is operated not only in a "bright" operation state but also in a "dark" operation state. In the "bright" operation state, the liquid crystal display apparatus can suffer from deterioration in luminance and viewing angle and color distortion at the lateral side thereof, as compared to the front side thereof, when displaying an image on the screen. On the other hand, in the "dark" operation state, the liquid crystal display apparatus can have a problem of poor black visibility through deterioration in uniformity of the screen in a diagonal direction and at the lateral side thereof and generation of observable stains due to light leakage. In the dark operation state, the liquid crystal panel has much lower luminance than in the bright operation state. Accordingly, even when the liquid crystal display has improved viewing angle in the bright operation state, it cannot be confirmed that it has also improved the black visibility in the dark operation state.

As a method of improving the black visibility, an antireflection film, a low-reflection film or an ultra-low-reflection film may be stacked on a surface on which external light is first incident. However, this method cannot fundamentally prevent light leakage due to the backlight of the liquid crystal display apparatus.

The background technique of the present invention is disclosed in Korean Patent Laid-open Publication No. 2018-0047569 and the like.

SUMMARY

According to an aspect of embodiments of the present invention, a liquid crystal display apparatus that has improved black visibility and external appearance in a dark operation state is provided.

According to another aspect of embodiments of the present invention, a liquid crystal display apparatus that has improved viewing angle at a lateral side thereof, particularly right and left viewing angle, in a bright operation state is provided.

Aspects of one or more embodiments of the present invention relate to a liquid crystal display apparatus.

According to one or more embodiments, a liquid crystal display apparatus includes: a liquid crystal panel; a viewer-side polarizing plate stacked on a light exit surface of the liquid crystal panel; and a first optical sheet and a second optical sheet sequentially stacked on a light incidence surface of the liquid crystal panel, wherein the viewer-side polarizing plate includes a polarizer; and a contrast ratio or viewing angle-enhancing layer; the liquid crystal panel has a horizontal direction corresponding to a long side thereof and a vertical direction corresponding to a short side thereof; and the first optical sheet has a plurality of first optical patterns on a light exit surface thereof, an angle of a longitudinal direction of the first optical patterns relative to the vertical direction of the liquid crystal panel being from −10° to +10°.

In one or more embodiments, the first optical sheet may be a sheet collecting light of left and right directions and the second optical sheet may be a sheet collecting light of upward and downward directions.

In one or more embodiments, the second optical sheet may have a plurality of second optical patterns on a light exit surface thereof and an angle of a longitudinal direction of the second optical patterns relative to the vertical direction of the liquid crystal panel may be from 80° to 100°.

In one or more embodiments, the first optical patterns may have an apex angle $\alpha$ of 70° to 120° and the second optical patterns may have an apex angle $\beta$ of 70° to 120°.

In one or more embodiments, each of the first optical patterns and the second optical patterns may have a stripe shape extending in a longitudinal direction thereof.

In one or more embodiments, an angle of the longitudinal direction of the first optical patterns relative to a light absorption axis of the polarizer may be from −10° to 10° or from 80° to 100°.

In one or more embodiments, the contrast ratio or viewing angle-enhancing layer may include at least one of a patterned contrast ratio-enhancing layer and a non-patterned contrast ratio-enhancing layer.

In one or more embodiments, the contrast ratio or viewing angle-enhancing layer may include the patterned contrast ratio-enhancing layer, and the patterned contrast ratio-enhancing layer may include a first resin layer and a second resin layer having different indexes of refraction relative to the first resin layer, and a patterned portion having at least one engraved optical pattern may be formed at an interface between the first resin layer and the second resin layer.

In one or more embodiments, an angle of a longitudinal direction of the engraved optical patterns relative to the vertical direction of the liquid crystal panel may be from −10° to +10°.

In one or more embodiments, the engraved optical patterns may have a higher aspect ratio than the first optical patterns.

In one or more embodiments, the engraved optical patterns may have an aspect ratio of 0.3 or more.

In one or more embodiments, the engraved optical patterns may have a first surface at a top thereof and both lateral sides connected to the first surface and each of the lateral sides may have at least one flat surface or curved surface.

In one or more embodiments, the patterned portion may further include a flat section between adjacent engraved optical patterns.

In one or more embodiments, a difference in index of refraction between the first resin layer and the second resin layer may be 0.2 or less.

In one or more embodiments, the contrast ratio or viewing angle-enhancing layer may include the non-patterned contrast ratio-enhancing layer, and the non-patterned contrast ratio-enhancing layer may include a single layer including a matrix; and optically anisotropic materials aligned in the matrix.

In one or more embodiments, an alignment angle of the optically anisotropic materials with respect to the vertical direction of the liquid crystal panel may be from 65° to 115° or from −25° to 25°.

In one or more embodiments, the optically anisotropic materials may have a wire shape, a fiber shape, or an acicular shape.

In one or more embodiments, the optically anisotropic materials may include at least one selected from among wires formed of at least one selected from among a metal, a nonmetal, a metal oxide, a nonmetal oxide, a metal sulfide, a nonmetal sulfide, a metal nitride, a nonmetal nitride, a metal hydroxide, a nonmetal hydroxide, and glass, and acicular particles formed of at least one selected from among titanium oxide, zirconium oxide, zinc oxide, calcium carbonate, Boehmite, aluminum borate, calcium silicate, magnesium sulfate, magnesium sulfate hydrate, potassium titanate, glass, and a synthetic resin.

In one or more embodiments, the viewer-side polarizing plate may be free from at least one of an antireflection layer, a low-reflection layer, and an ultralow-reflection layer.

According to an aspect of embodiments of the present invention, a liquid crystal display apparatus has improved black visibility and external appearance in a dark operation state.

According to an aspect of embodiments of the present invention, a liquid crystal display apparatus has improved viewing angle at a lateral side thereof, particularly right and left viewing angle, in a bright operation state.

DETAILED DESCRIPTION OF THE DRAWINGS

DETAILED DESCRIPTION

Figure 1:
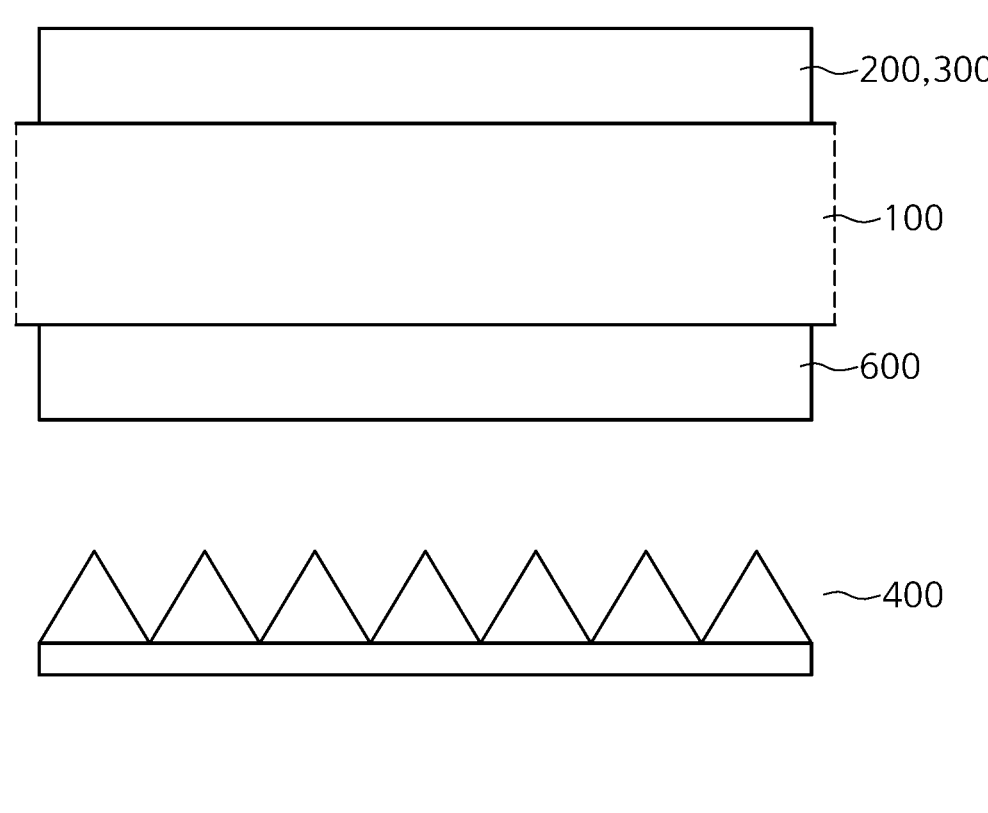
FIG. 1 is a partial cross-sectional view of a liquid crystal display apparatus according to an embodiment of the present invention.
Figure 2:
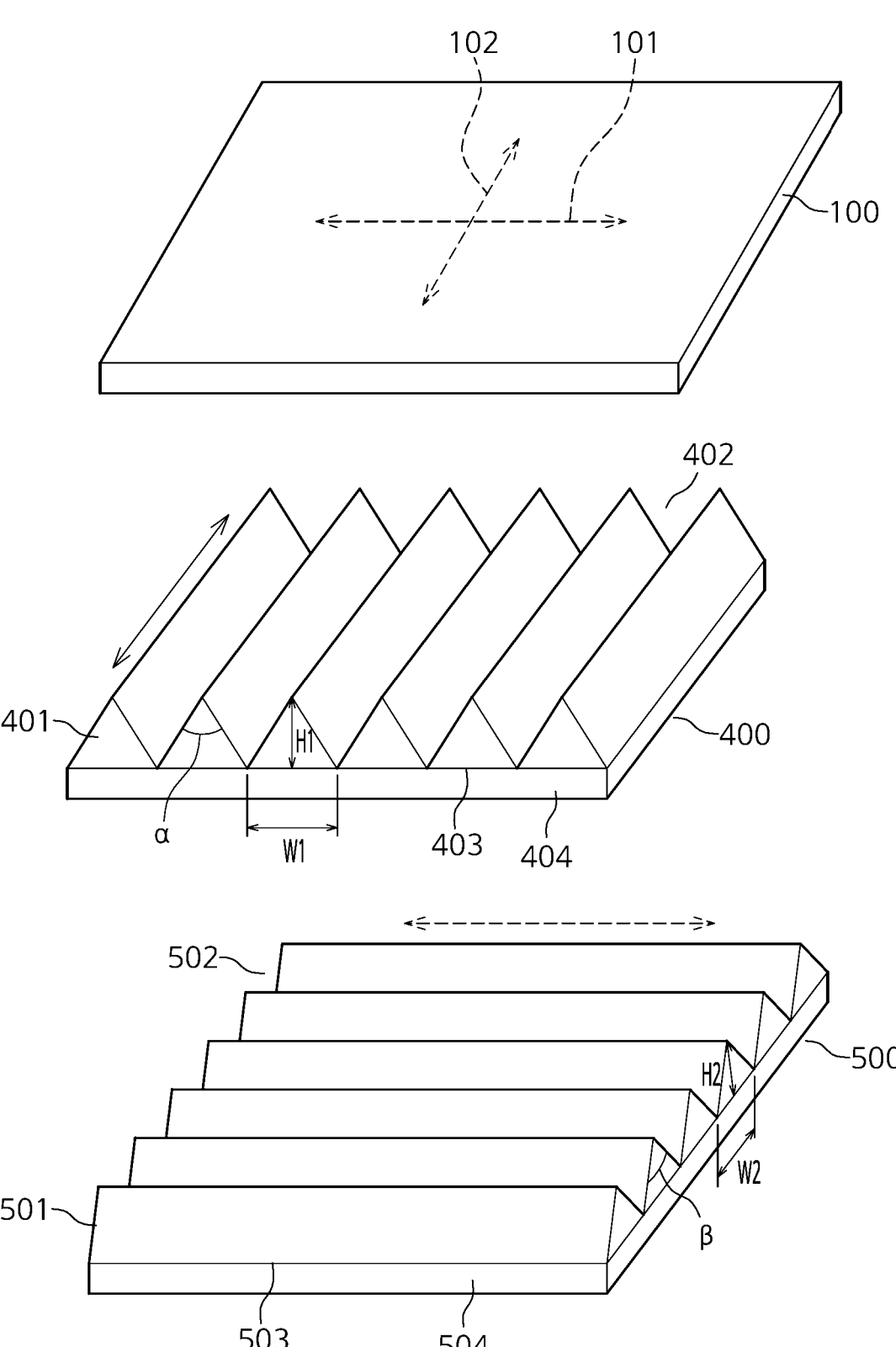
FIG. 2 is a schematic perspective view of a liquid crystal panel, a first optical sheet, and a second optical sheet shown in FIG. 1.

Herein, some embodiments of the present invention will be described in further detail with reference to the accompanying drawings such that the present invention can be easily implemented by those skilled in the art. It is to be understood that the present invention may be embodied in different ways and is not limited to the following embodiments.

In the drawings, components unrelated to the description may be omitted for clear description of the invention, and like components will be denoted by like reference numerals throughout the specification.

Herein, spatially relative terms, such as "upper" and "lower," are defined with reference to the accompanying drawings. Thus, it will be understood that "upper surface" can be used interchangeably with "lower surface," and when an element is referred to as being placed "on" another element, it may be directly placed on the other element, or one or more intervening elements may be present. When an element is referred to as being placed "directly on" another element, there are no intervening element(s) therebetween.

Herein, "in-plane retardation (Re)" is a value measured at a wavelength of 550 nm, as calculated according to Equation A:

$$Re=(nx-ny)\times d, \qquad \text{Equation A}$$

where nx and ny are the indexes of refraction of a protective film or protective layer in the slow direction and the fast axis direction thereof at a wavelength of 550 nm, respectively, and d is the thickness (unit: nm) of the protective film or protective layer.

Herein, "(meth)acryl" refers to acryl and/or methacryl.

As used herein to represent a specific numerical range, "X to Y" means "X≤ and ≤Y".

Embodiments of the present invention provide a liquid crystal display apparatus that improves lateral viewing angles, particularly right and left viewing angle, in a bright operation state, while providing good external appearance by improving black visibility in a dark operation state. In particular, the liquid crystal display apparatus can improve black visibility even without a surface treatment layer for improvement in black visibility, such as an antireflection layer, a low-reflection layer, or an ultralow-reflection layer, on a viewer-side polarizing plate.

Herein, both "bright operation state" and "dark operation state" are defined with respect to the liquid crystal display apparatus in a turned-on state. Since the liquid crystal display apparatus is operated upon application of voltage thereto, brightness of the liquid crystal display apparatus is determined by the voltage applied thereto. Signals classified into 0 to 255 gray levels with 8 bits from the minimum operation voltage to the maximum operation voltage are sent to the liquid crystal panel. Assuming that the luminance value is defined as "luminance of 0 gray scale (black color)," when a gray level input to the liquid crystal panel at the entirety of the front side and the lateral sides is 0 and the luminance value is defined as "luminance of 255 gray scale (white color)" when the gray level input to the liquid crystal panel is 255, the bright operation state means that the gray level input to the panel is in the range of 33 to 255 and the dark operation state means that the gray level input to the panel is in the range of 0 to less than 33. "Operation luminance" of the panel may be measured in cd/m² by a physical photometric method in which actual brightness of the panel in response to a panel input signal is measured using a luminance meter, and luminance values of 0 gray scale (black color) to 255 gray scale (white color) are determined according to an actual luminance curve of the panel in response to an input signal at each gray level of the panel.

The liquid crystal display apparatus according to one or more embodiments includes: a liquid crystal panel; a viewer-side polarizing plate stacked on a light exit surface of the liquid crystal panel; and a first optical sheet and a second optical sheet sequentially stacked on a light incidence surface of the liquid crystal panel, wherein the viewer-side polarizing plate includes a polarizer and a contrast ratio or viewing angle-enhancing layer; the liquid crystal panel has a horizontal direction corresponding to a long side thereof and a vertical direction corresponding to a short side thereof; and the first optical sheet has a plurality of first optical patterns formed on a light exit surface thereof, and an angle of a longitudinal direction of the first optical patterns relative to the vertical direction of the liquid crystal panel is from −10° to +10°. As the angle of the longitudinal direction of the first optical patterns relative to the vertical direction of the liquid crystal panel is set in the range of −10° to +10°, it is possible to easily achieve concurrent, or simultaneous, improvement in both right and left viewing angle and black visibility. In one or more embodiments, the angle is from −5° to +5°, and, in one or more embodiments, 0°. In description of the angle, '+' means an angle in the clockwise direction relative to a reference point, that is, a vertical direction corresponding to a short side of the liquid crystal panel, and '−' means an angle in the counterclockwise direction relative to the reference point, that is, the vertical direction corresponding to the short side of the liquid crystal panel.

Next, a liquid crystal display apparatus will be described with reference to FIG. 1 to FIG. 5.

In an embodiment, a liquid crystal display apparatus includes a liquid crystal panel 100, a viewer-side polarizing plate 200; 300, a light source-side polarizing plate 600, a first optical sheet 400, and a second optical sheet 500.

Liquid Crystal Panel

The liquid crystal panel 100 has a light exit surface and a light incidence surface, which are facing away from each other. The light incidence surface is a plane through which light (internal light) emitted from a light source (not shown in FIG. 1) disposed under a lower surface of the second optical sheet 500 enters the liquid crystal panel 100. The light exit surface is a plane through which light having entered the liquid crystal panel 100 exits towards the viewer-side polarizing plate 200; 300.

In an embodiment, the liquid crystal panel 100 has a rectangular shape composed of long sides corresponding to a horizontal direction 101 and short sides corresponding to a vertical direction 102. The horizontal direction 101 is substantially orthogonal to the vertical direction 102.

The liquid crystal panel 100 may employ typical liquid crystals known to those skilled in the art. For example, the liquid crystals may include at least one selected from among a vertical alignment (VA) mode, an in-plane switching (IPS) mode, a twisted nematic (TN) mode, a fringe field switching (FFS) mode, a patterned vertical alignment (PVA) mode, and a super-patterned vertical alignment (S-PVA) mode, without being limited thereto.

First Optical Sheet and Second Optical Sheet

The first optical sheet 400 and the second optical sheet 500 are sequentially stacked on the light incidence surface of the liquid crystal panel 100 from the liquid crystal panel 100. Each of the first optical sheet 400 and the second optical sheet 500 may discharge light after collection of the light emitted from the light source, thereby improving luminous efficacy.

The first optical sheet 400 and the second optical sheet 500 may have different light collecting functions. In an embodiment, the first optical sheet 400 may act as a lateral-light collecting sheet, i.e. a sheet collecting light of left and right directions for light emitted from the light source, and the second optical sheet 500 may act as a vertical-light collecting sheet, i.e. a sheet collecting light in upward and downward directions for light emitted from the light source.

The lateral-light collecting sheet means a sheet having a function of collecting light emitted from the light source in the horizontal direction 101 corresponding to the long sides of the liquid crystal panel 100. The vertical-light collecting sheet means a sheet having a function of collecting light emitted from the light source in the vertical direction 102 corresponding to the short sides of the liquid crystal panel 100. The liquid crystal display apparatus includes both the first optical sheet 400 and the second optical sheet 500, in which the first optical sheet 400 corresponding to the lateral-light collecting sheet is disposed closer to the liquid crystal panel 100 than the second optical sheet 500 corresponding to the vertical-light collecting sheet, thus to improve black visibility and external appearance.

The first optical sheet 400 is provided with a plurality of first optical patterns 401 on a light exit surface 402, in which an angle (A) of the longitudinal direction (indicated by a solid arrow in FIG. 2) of the first optical patterns 401 relative to the vertical direction 102 of the liquid crystal panel 100 is in a range of −10° to +10°. Within this range, the liquid crystal display apparatus can exhibit remarkable improvement in black visibility and lateral viewing angle. For example, the angle (A) may be −10°, −9°, −8°–7°, −6°, −5°, −4°, −3°, −2°, −1°, 0°, 1°, 2°, 3°, 4°, 5°, 6°, 7°, 8°, 9°, or 10°, and, in an embodiment, −5° to +5°, and, in an embodiment, 0°.

A typical surface treatment layer, such as an antireflection layer, a low-reflection layer, or an ultralow-reflection layer may be used to prevent or substantially prevent deterioration in black visibility and external appearance due to leakage of light entering the liquid crystal display apparatus driven in the "dark" operation state. According to the present invention, even when the typical surface treatment layer is not applied to the viewer-side polarizing plate, the liquid crystal panel provides good external appearance through improvement in black visibility in the "dark" operation state by adjusting the angle of the longitudinal direction of the first optical patterns relative to the vertical direction of the liquid crystal panel in the lateral-light collecting layer having a lateral-light collecting function among the plurality of optical sheets disposed at a light source side of the liquid crystal panel.

According to one or more embodiments of the present invention, instead of using the viewer-side polarizing plate on the light exit surface of the liquid crystal panel to improve black visibility, the first optical sheet providing the lateral-light collecting function and the second optical sheet providing a vertical-light collecting function are sequentially stacked on the light incidence surface of the liquid crystal panel, in which an angle defined between the longitudinal direction of the first optical patterns of the first optical sheet and the vertical direction of the liquid crystal panel can be adjusted.

In addition, according to one or more embodiments of the present invention, the viewer-side polarizing plate is provided with a contrast ratio or viewing angle-enhancing layer to achieve remarkable improvement in contrast ratio and viewing angle at front and lateral sides in the bright and dark operation states through adjustment of the above angle.

In the first optical sheet 400, the light exit surface 402 corresponding to an upper surface of the first optical sheet 400 is formed with a plurality of first optical patterns 401, whereas a light incidence surface 403 corresponding to a lower surface of the first optical sheet 400 is not formed with any optical pattern, whereby the lower surface of the first optical sheet may be generally flat.

In an embodiment, the first optical patterns 401 may be an optical pattern having a polygonal shape cross-section, in which the polygonal shape has an apex angle α of 70° to 120°, for example, 70°, 71°, 72°, 73°, 74°, 75°, 78°, 77°, 78°, 79°, 80°, 81°, 82°, 83°, 84°, 85°, 88°, 87°, 88°, 89°, 90°, 91°, 92°, 93°, 94°, 95°, 98°, 97°, 98°, 99°, 100°, 101°, 102°, 103°, 104°, 105°, 106°, 107°, 108°, 109°, 110°, 111°, 112°, 113°, 114°, 115°, 116°, 117°, 118°, 119°, or 120°. Within this range, the first optical patterns 401 can further improve the right and left viewing angle when applied to the second optical sheet described below. The "apex angle" means an angle defined at the top portion among multiple angles of the polygonal shape. The polygonal shape may be an n-gonal shape (n being an integer of 3 to 10), such as any of a triangular shape, a quadrangular shape, a pentagonal shape, a hexagonal shape, and the like, and, in an embodiment, a triangular shape. Here, the top portion means the highest portion of the first optical pattern.

As shown in the drawings, the first optical patterns 401 may have a stripe shape extending in the longitudinal direction thereof.

In an embodiment, the first optical patterns 401 may have an aspect ratio (ratio of a height H1 to a width W1) of 0.1 to 10, for example, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.5, 3.0, 3.5, 4.0, 4.5, 5.0, 5.5, 6.0, 6.5, 7.0, 7.5, 8.0, 8.5, 9.0, 9.5, or 10.0, and, in an embodiment, 0.3 to 1.0, and, in an embodiment, 0.3 to 0.9. Within this range, the first optical patterns 401 can provide a light collecting effect. In an embodiment, the first optical patterns 401 may have the width W1 of 10 μm to 200 μm, for example, 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, or 200 μm, and, in an embodiment, 40 μm to 150 μm, and the height H1 of 10 μm to 200 μm, for example, 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, or 200 μm, and, in an embodiment, 20 μm to 50 μm. Within this range, the liquid crystal display apparatus can easily achieve the aspect ratio of the present invention while easily improving black visibility.

In an embodiment, the first optical patterns 401 may be consecutively arranged without a separation distance therebetween. In another embodiment, the first optical patterns 401 may be arranged at certain intervals to have a separation distance between adjacent first optical patterns. In an embodiment, the first optical patterns are consecutively arranged without a separation distance therebetween to further improve the effects of the present invention.

In an embodiment, a separation distance between adjacent first optical patterns 401 may be in a range from 0 μm to 100 μm, and, in an embodiment, 0 μm to μm. Within this range, the first optical sheet 400 according to the present invention can be easily manufactured.

As shown in the drawings, in an embodiment, the first optical sheet 400 may further include a base layer formed on lower surfaces of the first optical patterns and having a thickness (e.g., a predetermined thickness) or may be composed only of the first optical patterns without the base layer. In addition, the first optical sheet 400 may be directly formed on the second optical sheet 500 or may be directly formed under or on a reflective polarizing film.

The second optical sheet 500 may have a plurality of second optical patterns 501 on a light exit surface 502 thereof, in which an angle (B) of a longitudinal direction (indicated by a dotted line in FIG. 2) of the second optical patterns 501 relative to the vertical direction 102 of the liquid crystal panel 100 is in a range from 80° to 100°. Within this range, the second optical sheet 500 can achieve remarkable improvement in lateral viewing angle and black visibility. For example, the angle (B) may be 80°, 81°, 82°, 83°, 84°, 85°, 88°, 87°, 88°, 89°, 90°, 91°, 92°, 93°, 94°, 95°, 96°, 97°, 98°, 99°, or 100°, and, in an embodiment, 90°.

According to one or more embodiments of the present invention, the second optical sheet 500 providing the vertical-light collecting function is disposed on the lower surface of the first optical sheet 400, thereby further improving lateral viewing angle and black visibility through adjustment of the angle (B) of the longitudinal direction of the second optical patterns 501 relative to the vertical direction 102 of the liquid crystal panel 100.

In the second optical sheet 500, the light exit surface 502 corresponding to an upper surface of the second optical sheet 500 is formed with the plurality of second optical patterns 501, whereas a light incidence surface 503 corresponding to a lower surface thereof is generally flat, whereby the lower surface may be generally flat.

In an embodiment, the second optical patterns 501 may have a polygonal shape cross-section, in which the polygonal shape has an apex angle β of 70° to 120°. Within this range, the second optical patterns 501 can further improve the right and left viewing angle when applied to the first optical sheet described above. The "apex angle" means an angle defined at the top portion of the polygonal shape. The polygonal shape may be an n-gonal shape (n being an integer of 3 to 10), such as any of a triangular shape, a quadrangular shape, a pentagonal shape, a hexagonal shape, and the like, and, in an embodiment, a triangular shape. For example, the apex angle β may be 70°, 71°, 72°, 73°, 74°, 75°, 76°, 77°, 78°, 79°, 80°, 81°, 82°, 83°, 84°, 85°, 86°, 87°, 88°, 89°, 90°, 91°, 92°, 93°, 94°, 95°, 96°, 97°, 98°, 99°, 100°, 101°, 102°, 103°, 104°, 105°, 106°, 107°, 108°, 109°, 1100, 111°, 112°, 113°, 114°, 115°, 116°, 117°, 118°, 119°, or 120°, and, in an embodiment, 80° to 100°, and, in an embodiment, 90°.

As shown in the drawings, the second optical patterns 501 may have a stripe shape extending in the longitudinal direction thereof.

In an embodiment, the second optical patterns 501 may have an aspect ratio (ratio of a height H2 to a width W2) of 0.1 to 10, for example, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.5, 3.0, 3.5, 4.0, 4.5, 5.0, 5.5, 6.0, 6.5, 7.0, 7.5, 8.0, 8.5, 9.0, 9.5, or 10.0, and, in an embodiment, 0.3 to 1.0, and, in an embodiment, 0.3 to 0.9. Within this range, the second optical sheet 500 can secure the light collecting effect.

In an embodiment, the second optical patterns 501 may have the width W2 of 10 μm to 200 μm, for example, 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, or 200 μm, and, in an embodiment, 40 μm to 150 μm, and the height H2 of 10 μm to 200 μm, for example, 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, or 200 μm, and, in an embodiment, 20 μm to 50 μm. Within this range, the liquid crystal display apparatus can easily achieve the aspect ratio of the present invention while easily improving black visibility.

In an embodiment, the second optical patterns 501 may be consecutively arranged without a separation distance therebetween. In another embodiment, the second optical patterns 501 may be arranged at certain intervals to have a separation distance between adjacent first optical patterns. In an embodiment, the second optical patterns 501 are consecutively arranged without a separation distance therebetween.

In an embodiment, the separation distance between adjacent second optical patterns 501 may be in a range from 0 µm to 100 µm, and, in an embodiment, 0 µm to 20 µm. Within this range, the second optical sheet according to the present invention can be easily manufactured.

As shown in the drawings, in an embodiment, the second optical sheet 500 may further include a base layer 504 formed on lower surfaces of the second optical patterns and having a thickness (e.g., a predetermined thickness) or may be composed only of the second optical patterns.

In an embodiment, the first optical sheet 400 and the second optical sheet 500 may be stacked without an adhesive layer therebetween. In another embodiment, an adhesive layer may be further formed between the first optical sheet 400 and the second optical sheet 500.

The first optical sheet 400 and the second optical sheet 500 may be formed of a typical photocurable resin composition for optical sheets. The photocurable resin composition may include typical materials known to those skilled in the art.

Viewer-Side Polarizing Plate

The viewer-side polarizing plate 200; 300 is stacked on the light exit surface of the liquid crystal panel 100 and discharges light received from the liquid crystal panel 100, and serves to improve the contrast ratio at both of the front side and lateral side while improving the right and left viewing angle.

The viewer-side polarizing plate 200; 300 includes a polarizer 210; 310 and a contrast ratio-enhancing layer 220; 320. The contrast ratio-enhancing layer 220; 320 may be stacked on a light exit surface of the polarizer 210; 310 or on a light incidence surface thereof. In an embodiment, the contrast ratio-enhancing layer 220; 320 is stacked on the light exit surface of the polarizer 210; 310. The light exit surface refers to a plane of the polarizer through which light (internal light) emitted from the light source (not shown in FIG. 1) is discharged from the polarizer 210; 310. The light incidence surface refers to a plane of the polarizer 210; 310 through which light having entered the liquid crystal panel 100 enters the polarizer 210; 310.

The contrast ratio-enhancing layer 220; 320 may include at least one of a patterned contrast ratio-enhancing layer 220 having a patterned portion and a non-patterned contrast ratio-enhancing layer 320 free from a patterned portion.

According to an embodiment, the liquid crystal display apparatus may include any of viewer-side polarizing plates shown in FIG. 3, FIGS. 4A to 4D, and FIG. 5, as the viewer-side polarizing plate. Referring to each of FIG. 3, FIGS. 4A to 4D, and FIG. 5, the viewer-side polarizing plate will be described.

Figure 3:
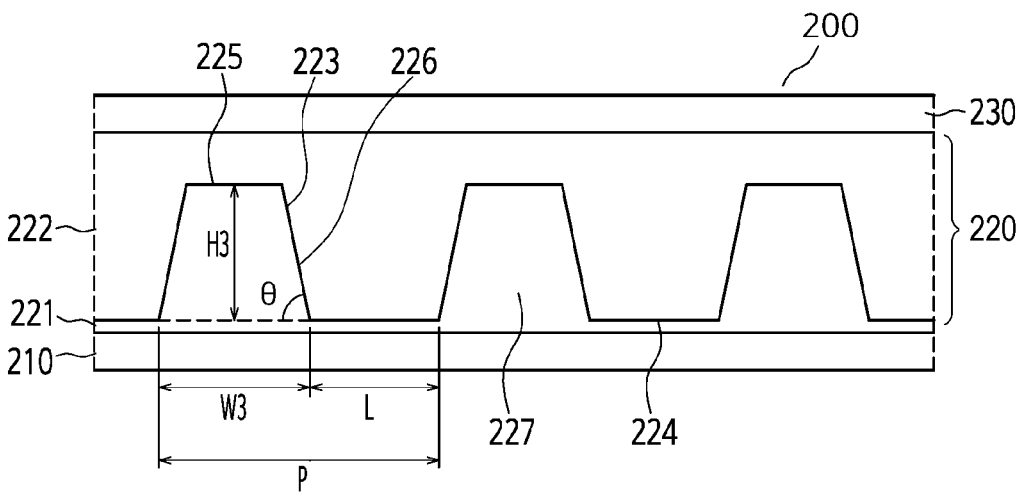
FIG. 3 is a partial cross-sectional view of a viewer-side polarizing plate shown in FIG. 1, according to an embodiment.

Referring to FIG. 3, the viewer-side polarizing plate 200 includes the polarizer 210; and a patterned contrast ratio-enhancing layer 220 and a first protective layer 230 stacked on the light exit surface of the polarizer 210.

The patterned contrast ratio-enhancing layer 220 includes a first resin layer 221 and a second resin layer 222, which have different indexes of refraction from each other, and a patterned portion is formed at an interface between the first resin layer 221 and the second resin layer 222. In an embodiment, the patterned portion may include engraved optical patterns 223 having a cross-section (e.g., a predetermined cross-section) and a flat section 224 formed between adjacent engraved optical patterns 223.

In an embodiment, a difference in index of refraction between the first resin layer 221 and the second resin layer 222 may be 0.2 or less, for example, 0.1 to 0.2. Within this range, the patterned contrast ratio-enhancing layer can assist in improvement in right and left viewing angle.

The first resin layer 221 and the second resin layer 222 are sequentially stacked on the light exit surface of the polarizer 210 and the first resin layer 221 may have a higher or lower index of refraction than the second resin layer 222.

In an embodiment, the first resin layer 221 has a lower index of refraction than the second resin layer 222. In an embodiment, the first resin layer 221 may have an index of refraction of less than 1.53, for example, 1.30 to less than 1.53, and the second resin layer 222 may have an index of refraction of 1.53 or more, for example, 1.53 to 1.70.

In an embodiment, the patterned portion may satisfy the following Equation 1 and each of the engraved optical patterns 223 may have a base angle θ of 75° to 90°. Within this range, the patterned contrast ratio-enhancing layer can assist in improvement in right and left viewing angles.

$$1 < P/W3 \leq 10, \qquad \text{Equation 1}$$

where P is a pitch of the patterned portion (unit: µm), and W3 is the maximum width of the engraved optical pattern (unit: µm).

The base angle θ means an angle defined between an oblique lateral sides 226 of the engraved optical pattern 223 and the maximum width W3 of the engraved optical pattern 223. In an embodiment, the base angle θ is in a range of 80° to 90° and P/W3 of Equation 1 is in a range of 1.2 to 8.

The engraved optical patterns 223 may include an optical pattern protruding from the first resin layer 221 to the second resin layer 222.

In an embodiment, the engraved optical patterns 223 may have a higher aspect ratio than the first optical patterns 401. With this structure, the liquid crystal display apparatus can easily realize the effects of the present invention.

In an embodiment, the engraved optical patterns 223 may have an aspect ratio (ratio of a maximum height H3 to a maximum width W3) of 0.3 or more. Within this range, the engraved optical patterns 223 can assist in improvement in right and left viewing angle. In an embodiment, the engraved optical patterns 223 have an aspect ratio or 0.6 or more, and, in an embodiment, 1.0 to 2, and, in an embodiment, greater than 1.0 to 2. According to one or more embodiments of the present invention, when the engraved optical patterns have an aspect ratio of 0.3 or more, the liquid crystal display apparatus can achieve remarkable improvement in right and left viewing angles and black visibility.

In an embodiment, the engraved optical patterns 223 may have a maximum width W3 of 3 µm to 50 µm, and, in an embodiment, 5 µm to 30 µm, and a maximum height H3 of 3 µm to 50 µm, and, in an embodiment, 5 µm to 20 µm. Within this range, the engraved optical patterns can easily achieve the aspect ratio of the present invention while enabling remarkable improvement in right and left viewing angles and black visibility of the liquid crystal display apparatus.

Each of the engraved optical patterns 223 may have a first surface 225 formed at the top portion thereof and both oblique lateral sides 226 connected to the first surface 225.

Light having entered the engraved optical patterns 223 is discharged through the first surface 225, thereby improving luminance. The first surface 225 may be a generally flat surface or may be a convex or concave surface. In an embodiment, the first surface 225 may have a maximum width of 1 μm to 40 μm, and, in an embodiment, 3 μm to 25 μm. Within this range, the engraved optical patterns 223 can improve right and left viewing angles of the liquid crystal display apparatus without deterioration in front luminance.

Each of the lateral sides 226 may be composed of one or more flat surfaces, for example, one to three flat surfaces.

In an embodiment, each of the lateral sides may be composed of one flat surface, as shown in FIG. 3.

Figure 4A:
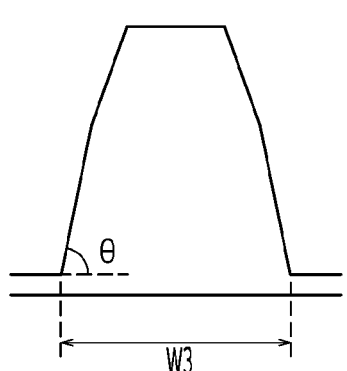
FIGS. 4A to 4D are cross-sectional views of an engraved optical pattern shown in FIG. 3, according to some further embodiments.
Figure 4B:
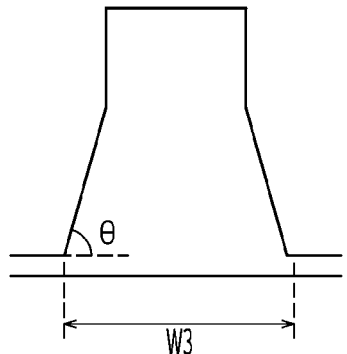
Figures 4C, 4D:
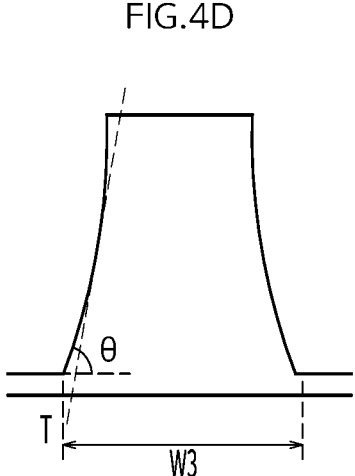

In another embodiment, each of the lateral sides may be composed of two or more flat surfaces, as shown in FIGS. 4A and 4B, in which each of the flat surfaces may have different base angles θ with respect to the maximum width of the engraved optical patterns. Here, the base angle θ means an angle defined between a corresponding flat surface of the lateral side and the maximum width W3 of the engraved optical patterns. Each of the lateral sides may be a convex polygonal surface (see FIG. 4A) that protrudes from the first resin layer to the second resin layer or a concave polygonal surface (see FIG. 4B) that protrudes from the first resin layer to the second resin layer. The base angle θ may range from 60° to 90°, for example, 75° to 90°. Within this range, the effects of the present invention can be easily achieved.

For example, the engraved optical patterns may have an N-gonal shape cross-section (N being an integer of 3 to 10), such as a trapezoidal cross-section, a rectangular cross-section, or a square cross-section.

Each of the lateral sides may be composed of one or more curved surfaces, for example, one to three curved surfaces.

In an embodiment, each of the lateral sides may be composed of one curved surface. In another embodiment, each of the lateral sides may be composed of two or more curved surfaces, in which each of the curved surfaces may have different base angles θ with respect to the maximum width of the engraved optical patterns. Here, the base angle θ means an angle defined between a tangential line (T) of the corresponding curved surface at a half point of the maximum height H3 of the engraved optical patterns and the maximum width W3 of the first optical patterns.

Here, each of the lateral sides may be a convexly curved surface (see FIG. 4C) that protrudes from the first resin layer to the second resin layer or a concavely curved surface (see FIG. 4D) that protrudes from the first resin layer to the second resin layer. In an embodiment, the base angle may be in a range from 60° to 90°, for example, 75° to 90°. Within this range, the liquid crystal display apparatus can easily realize the effects of the present invention.

In an embodiment, the patterned portion may have a pitch P of 5 μm to 500 μm, and, in an embodiment, 10 μm to 50 μm. Within this range, the patterned portion can easily satisfy Equation 1 and can be easily formed. Here, the pitch P means the sum of the maximum width W3 of one engraved optical pattern and a maximum width L of a separation surface between adjacent engraved optical patterns.

Adjacent engraved optical patterns 223 may be spaced apart from each other by a flat section 224. The flat section 224 allows light vertically received from the polarizer to pass therethrough, thereby improving luminance. In an embodiment, the maximum width L of the flat section 224 may be in a range from 1 μm to 40 μm, and, in an embodiment, 3 μm to 25 μm. Within this range, the engraved optical patterns can improve viewing angle of the liquid crystal display apparatus while minimizing or reducing loss of front luminance.

Although not shown in FIG. 3, each of the engraved optical patterns 223 may be formed in a stripe shape extending in the longitudinal direction thereof.

In an embodiment, an angle (C) of the longitudinal direction of the engraved optical patterns 223 relative to the vertical direction of the liquid crystal panel 100 corresponding to a short side thereof may be in a range from −10° to +10°. As the angle of the longitudinal direction of the engraved optical patterns 223 relative to the vertical direction of the liquid crystal panel is in a range from −10° to +10°, the liquid crystal display apparatus can easily achieve concurrent, or simultaneous, improvement in right and left viewing angles and black visibility. For example, the angle (C) may be −10°, −9°, −8°, −7°, −6°, −5°, −4°, −3°, −2°, −1°, 0°, +1°, +2°, +3°, +4°, +5°, +6°, +7°, +8°, +9°, or +10°, and, in an embodiment, −5° to +5°, and, in an embodiment, 0°.

The first resin layer 221 may have a filling pattern 227 which fills at least part of the engraved optical patterns 223.

The polarizer 210 serves to polarize light received from the liquid crystal panel to discharge polarized light, which passes through a patterned layer.

The polarizer 210 may include a polyvinyl alcohol-based polarizer formed by uniaxially stretching a polyvinyl alcohol film or a polyene-based polarizer formed through dehydration of the polyvinyl alcohol film. The polarizer may be manufactured using a polyvinyl alcohol film by a typical method known to those skilled in the art.

In an embodiment, the polarizer 210 may have a thickness of 5 μm to 40 μm. Within this range, the polarizer 210 can be used in an optical display.

In the first optical sheet 400, an angle (D) of the longitudinal direction of the first optical patterns 401 relative to a light absorption axis of the polarizer 210 may be in a range from −10° to 10° or from 80° to 100°, for example, −10°, −9°, −8°, −7°, −6°, −5°, −4°, −3°, −2°, −1°, 0°, 1°, 2°, 3°, 4°, 5°, 6°, 7°, 8°, 9°, 10°, 80°, 81°, 82°, 83°, 84°, 85°, 86°, 87°, 88°, 89°, 90°, 91°, 92°, 93°, 94°, 95°, 96°, 97°, 98°, 99°, or 100°, and, in an embodiment, −5° to 5° or 85° to 95°. Within this range, the liquid crystal display apparatus can easily realize the effects of the present invention. Here, the light absorption axis of the polarizer 210 corresponds to a machine direction of the polarizer 210.

The first protective layer 230 may be a light transmittance layer and allows light spreading through the patterned layer 220 to pass therethrough.

The first protective layer 230 may be a retardation film or an isotropic film providing a range (e.g., a predetermined range) of phase difference. In an embodiment, the first protective layer 230 may have an in-plane retardation Re of 8,000 nm or more, and, in an embodiment, 10,000 nm or more, and, in an embodiment, greater than 10,000 nm, and, in an embodiment, 10,100 nm to 15,000 nm. Within this range, the protective layer can prevent or substantially prevent observation of rainbow spots and can further improve an effect of spreading light having passed through the second resin layer 222 and the first resin layer 221. In another embodiment, the first protective layer 230 may be an isotropic film having an in-plane retardation Re of 60 nm or less, and, in an embodiment, 0 nm to 60 nm, and, in an embodiment, 40 nm to 60 nm. Within this range, the first protective layer 230 can improve image quality through compensation of viewing angle. Here, the isotropic film means a film, all of nx, ny, and nz of which have substantially the same values, and "substantially the same" means not only a case in which the retardation values are completely the same, but also a case in which there is a slight difference therebetween. In an embodiment, the first protective layer has an in-plane retardation Re of 8,000 nm or more, and, in an embodiment, 10,000 nm or more, and, in an embodiment, greater than 10,000 nm.

In an embodiment, the first protective layer 230 may have a thickness of 20 μm to 120 μm, and, in an embodiment, 30 μm to 80 μm. Within this range, the first protective layer 230 can be applied to an optical display. In an embodiment, the first protective layer 230 may have a light transmittance of 80% or more, and, in an embodiment, 85% to 95%, in the visible spectrum region. The first protective layer 230 may include a film prepared by monoaxially or biaxially stretching an optical transparent resin. In an embodiment, the resin may include at least one selected from among polyesters including polyethylene terephthalate (PET), polybutylene terephthalate, polyethylene naphthalate, polybutylene naphthalate, and the like, acryl, cyclic olefin polymers (COP), cellulose esters including triacetyl cellulose (TAC), and the like, polyvinyl acetate, polyvinyl chloride (PVC), polynorbornene, polycarbonate (PC), polyamide, polyacetal, polyphenylene ether, polyphenylene sulfide, polysulfone, polyether sulfone, polyarylate, and polyimide. In an embodiment, the protective layer includes a film formed of a polyester resin. The first protective layer 230 may include a film manufactured through modification of the above resins. Modification may include copolymerization, branching, cross-linking, or modification of molecular terminals.

Although not shown in FIG. 3, in an embodiment, a functional coating layer may be further formed on at least one surface of the first protective layer 230 to provide additional functions. The functional coating layer may be a primer layer, a hard coating layer, or an anti-fingerprint layer, without being limited thereto.

A viewer-side polarizing plate including a non-patterned contrast ratio-enhancing layer will be described with reference to FIG. 5.

Figure 5:
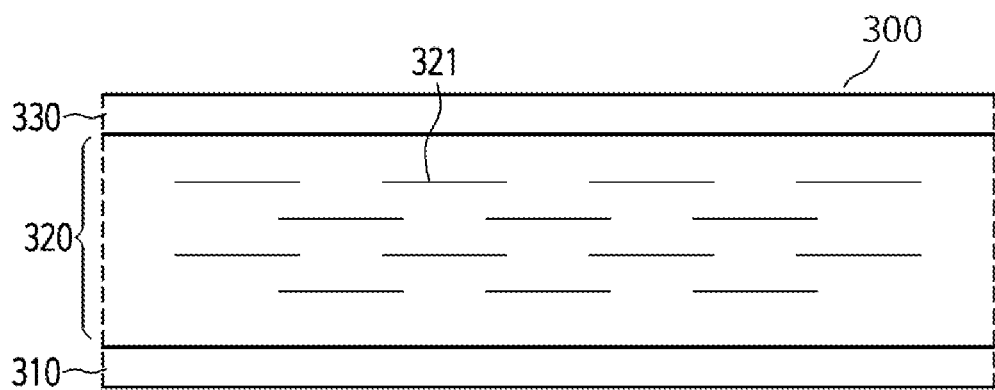
FIG. 5 is a partial cross-sectional view of the viewer-side polarizing plate shown in FIG. 1, according to another embodiment.

Referring to FIG. 5, the viewer-side polarizing plate 300 includes a polarizer 310; and a non-patterned contrast ratio-enhancing layer 320 and a first protective layer 330 sequentially stacked on a light exit surface of the polarizer 310.

In an embodiment, the polarizer 310 and the first protective layer 330 are substantially the same as the polarizer 210 and the first protective layer 230 shown in FIG. 3. An angle (D) of the longitudinal direction of the first optical patterns relative to the light absorption axis of the polarizer 310 may be in a range from −10° to 10° or from 80° to 100°, for example, −10°, −9°, −8°, −7°, −6°, −5°, −4°, −3°, −2°, −1°, 0°, 1°, 2°, 3°, 4°, 5°, 6°, 7°, 8°, 9°, 10°, 80°, 81°, 82°, 83°, 84°, 85°, 86°, 87°, 88°, 89°, 90°, 91°, 92°, 93°, or 100°, and, in an embodiment, −5° to 5°, or 85° to 95°. Within this range, the liquid crystal display apparatus can easily realize the effects of the present invention.

The following description will focus on the non-patterned contrast ratio-enhancing layer 320.

The non-patterned contrast ratio-enhancing layer 320 is composed of a single layer including a matrix and each of upper and lower surfaces of the non-patterned contrast ratio-enhancing layer 320 is a generally flat surface. Although the non-patterned contrast ratio-enhancing layer 320 does not include the patterned portion, unlike the contrast ratio-enhancing layer 220, the non-patterned contrast ratio-enhancing layer 320 includes an optically anisotropic material, which is aligned in the matrix to provide the effects of improving the contrast ratio and viewing angle.

In an embodiment, an alignment angle (C) of the optically anisotropic material relative to the vertical direction corresponding to the short side of the liquid crystal panel may be in a range from 65° to 115° or from −25° to 25°. Within this range, the liquid crystal display apparatus can easily achieve concurrent, or simultaneous, improvement in right and left viewing angles and black visibility. For example, the angle (C) may be 65°, 66°, 67°, 68°, 69°, 70°, 71°, 72°, 73°, 74°, 75°, 76°, 77°, 78°, 79°, 80°, 81°, 82°, 83°, 84°, 85°, 86°, 87°, 88°, 89°, 90°, 91°, 92°, 93°, 94°, 95°, 96°, 97°, 98°, 99°, 100°, 101°, 102°, 103°, 104°, 105°, 106°, 107°, 108°, 109°, 110°, 111°, 112°, 113°, 114°, 115°, −25°, −24°, −23°, −22°, −21°, −20°, −19°, −18°, −17°, −16°, −15°, −14°, −13°, −12°, −11°, −10°, −9°, −8°, −7°, −8°, −5°, −4°, −3°, −2°, −1°, 0°, 1°, 2°, 3°, 4°, 5°, 6°, 7°, 8°, 9°, 10°, 11°, 12°, 13°, 14°, 15°, 16°, 17°, 18°, 19°, 20°, 21°, 22°, 23°, 24°, or 25°, and, in an embodiment, 85° to 95° or −5° to +5°, and, in an embodiment, 0°. In an embodiment, among the entirety of the optically anisotropic material, 60 wt % or more, for example, 85 wt % to 95 wt %, of the optically anisotropic material may be aligned at the above angle (C) in the non-patterned contrast ratio-enhancing layer 320.

The optically anisotropic materials may have a wire shape, a fiber shape, or an acicular shape. In formation of the non-patterned contrast ratio-enhancing layer, such a shape can facilitate achievement of the effects of the present invention by allowing alignment of the optically anisotropic material at the above angle.

In an embodiment, in the non-patterned contrast ratio-enhancing layer, the optically anisotropic materials may be present in an amount of 1 wt % to 40 wt %, and, in an embodiment, 1 wt % to 30 wt %, 3 wt % to 15 wt %, or 4 wt % to 15 wt %, and, in an embodiment, 4 wt % to 10 wt %. Within this range, the optically anisotropic materials can assist improvement in contrast ratio and visibility. The optically anisotropic materials may be formed from at least one selected from among a metal, a nonmetal, a metal oxide, a nonmetal oxide, a metal sulfide, a nonmetal sulfide, a metal nitride, a nonmetal nitride, a metal hydroxide, a nonmetal hydroxide, glass, titanium oxide, zirconium oxide, zinc oxide, calcium carbonate, Boehmite, aluminum borate, calcium silicate, magnesium sulfate, magnesium sulfate hydrate, potassium titanate, and a synthetic resin.

The wires may have a much greater length than the diameter thereof to assist in improvement in contrast ratio and visibility.

In an embodiment, the wires may be nanowires or microwires and may have an aspect ratio (ratio of the length to the diameter) of 500 or less, and, in an embodiment, 200 or less, and, in an embodiment, 5 to 200, and, in an embodiment, 10 to 100. Within this range, the wires can assist improvement in contrast ratio and visibility while facilitating alignment thereof.

In an embodiment, the wires may be nanowires or microwires and may have a cross-section diameter of 20 μm or less, and, in an embodiment, greater than 0 μm to 20 μm or less, and, in an embodiment, 0.1 μm to 20 μm, and, in an embodiment, 0.5 μm to 1 μm. In an embodiment, the wires may have a length of 1 μm or more, and, in an embodiment, 5 μm to 4,000 μm, and, in an embodiment, 10 μm to 1,000 μm. Within this range, the wires can easily reach the aspect ratio described above. Herein, the "cross-section diameter" means a maximum cross-section diameter thereof.

In an embodiment, in the non-patterned contrast ratio-enhancing layer 320, the wires may be present in an amount of 1 wt % to 40 wt %, and, in an embodiment, 3 wt % to 15 wt %, and, in an embodiment, 4 wt % to 10 wt %. Within this range, the wires can assist improvement in contrast ratio and visibility.

The wires may have a higher or lower index of refraction than the matrix. In an embodiment, the wires have a higher index of refraction than the matrix to assist in improvement in contrast ratio and visibility without whitening problem.

In an embodiment, the wires may have a higher index of refraction than the matrix and may have an index of refraction of 1.5 or more, and, in an embodiment, 1.5 to 2.3, and, in an embodiment, 1.52 to 2.3. Within this range, a difference in index of refraction described blow can be easily achieved.

In another embodiment, the wires may have a lower index of refraction than the matrix and may have an index of refraction of 1.2 or more, and, in an embodiment, 1.4 to 1.6, and, in an embodiment, 1.43 to 1.6. Within this range, a difference in index of refraction described blow can be easily achieved.

In an embodiment, a difference in index of refraction between the wires and the matrix may be 0.8 or less, and, in an embodiment, 0.6 or less, and, in an embodiment, 0.1 to 0.6. Within this range, the wires can further improve the contrast ratio and luminance while allowing improvement in optical characteristics of the matrix.

The wires may include wires formed of at least one selected from among a metal, a nonmetal, a metal oxide, a nonmetal oxide, a metal sulfide, a nonmetal sulfide, a metal nitride, a nonmetal nitride, a metal hydroxide, a nonmetal hydroxide, and glass. In an embodiment, the non-patterned contrast ratio-enhancing layer includes metal oxide wires in order to improve the effect of improving the contrast ratio and visibility.

The metal may include at least one selected from among silver, gold, zinc, platinum, nickel, copper, aluminum, tungsten, and calcium.

The nonmetal may include at least one selected from among silicon, indium, tin, germanium, and carbon.

The metal oxide may include at least one selected from among zinc oxide, copper oxide, aluminum oxide, nickel oxide, tungsten oxide, and calcium oxide.

The metal sulfide may include at least one selected from among silver sulfide, zinc sulfide, nickel sulfide, copper sulfide, aluminum sulfide, and tungsten sulfide.

The non-patterned contrast ratio-enhancing layer may include a metal and at least one functional group compound having at least two chemical/physical bonds.

In an embodiment, the acicular particles may have a length (L) and a diameter (D) and the diameter (D) is not uniform over the entire length (L) and gradually decreases towards both ends of the acicular particles. The acicular particles having an uneven thickness exhibit optically anisotropic properties, thereby allowing light received from the polarizer to be discharged in different directions.

Acicular microparticles may refer to particles having a micrometer-scale length. The length (L) of the acicular microparticles has a micrometer-scale value. Here, "micrometer-scale value" means that the length (L) is 1 μm or more. In the present invention, the micrometer-scale length of the acicular microparticles facilitates alignment of the acicular microparticles to assist in improvement in contrast ratio and luminance. Acicular nanoparticles having a nanometer-scale length (L) are not easily aligned and make it difficult to secure the effects of the present invention.

In an embodiment, the acicular microparticles have a length (L) of 10 μm to 30 μm, and, in an embodiment, 15 μm to 28 μm. Within this range, the acicular microparticles can be easily aligned to assist in improvement in contrast ratio and luminance.

In an embodiment, the acicular particles may have a cross-section diameter (D) of 0.5 μm to 2 μm, and, in an embodiment, 1 μm to 2 μm. Within this range, the acicular particles can have a high aspect ratio to provide a lateral light-diffusing effect. Herein, the "cross-section diameter" means a maximum cross-section diameter thereof.

In an embodiment, the acicular particles may have an average aspect ratio of 5 to 60. Within this range, the acicular particles can easily secure improvement in contrast ratio and luminance. In an embodiment, acicular particles have an average aspect ratio of 10 to 50, and, in an embodiment, 10 to 18. Here, "average aspect ratio" means an average value of aspect ratios measured with respect to the acicular microparticles and "aspect ratio" means a ratio of the length of the acicular microparticles to the maximum diameter thereof.

In an embodiment, the acicular microparticles may have a higher index of refraction than the matrix. With this structure, the acicular microparticles can further improve the effect of improving lateral contrast ratio and luminance.

In an embodiment, a difference in index of refraction between the acicular microparticles and the matrix may be 0.8 or less, and, in an embodiment, 0.5 or less, and, in an embodiment, 0.15 to 0.25. Within this range, the acicular microparticles can further improve the contrast ratio and luminance while improving optical characteristics of the matrix.

In an embodiment, the acicular microparticles may have an index of refraction of 1.5 to 2.2, and, in an embodiment, 1.6 to 1.8, and, in an embodiment, 1.65 to 1.7. Within this range, the acicular microparticles can have a suitable index of refraction with respect to the matrix described below, thereby assisting in improvement in contrast ratio and visibility.

The acicular microparticles may be formed of at least one selected from among metal oxides, such as titanium oxide (e.g. $TiO_2$), zirconium oxide (e.g. $ZrO_2$), zinc oxide (e.g. ZnO), metal compounds, such as calcium carbonate ($CaCO_3$), Boehmite, aluminum borate (e.g. $AlBO_3$), calcium silicate (e.g. $CaSiO_3$, wollastonite), magnesium sulfate ($MgSO_4$), magnesium sulfate hydrate (e.g. $MgSO_4 \cdot 7H_2O$), potassium titanate (e.g. $K_2Ti_8O_{17}$), inorganic particles, such as glass and the like, and organic particles, such as synthetic resins and the like. In an embodiment, the acicular microparticles are formed of calcium carbonate ($CaCO_3$), thereby enabling easy implementation of the effects of the present invention while allowing easy manufacture.

The acicular microparticles may be included in the matrix without surface modification. However, the acicular microparticles subjected to surface modification can further improve compatibility with the matrix formed of an organic material described below and dispersion of the particles, thereby easily implementing the effects of the invention through improvement in optical characteristics of the non-patterned contrast ratio-enhancing layer without agglomeration of the acicular microparticles. In an embodiment, 50% or more, for example, 60% to 100%, or 60% to 95%, of the entire surface area of the acicular microparticles may be subjected to surface modification. Within this range, the acicular microparticles can further improve compatibility and dispersion.

In an embodiment, surface modification of the acicular microparticles may be performed using at least one selected from among a silane compound, a surfactant, and oils. In an embodiment, surface modification of the acicular microparticles is performed using a silane compound containing a (meth)acryloxy group or a (meth)acrylate group to secure good dispersion and compatibility with the matrix formed of an actinic radiation curable composition described below.

The silane compound containing a (meth)acryloxy group or a (meth)acrylate group may include 3-(meth)acryloyloxy-propylmethyldimethoxysilane, 3-(meth)acryloyloxypropylt-rimethoxysilane, 3-(meth)acryloyloxypropylmethyldiethox-ysilane, and 3-(meth)acryloyloxypropyl triethoxysilane, preferably at least one selected from among 3-(meth)acry-loyloxypropyltrimethoxysilane and 3-(meth)acryloyloxy-propyltriethoxysilane.

In an embodiment, a difference in index of refraction between the acicular microparticles subjected to surface modification and the matrix may be 0.8 or less, and, in an embodiment, 0.5 or less, and, in an embodiment, 0.15 to 0.25. Within this range, the acicular microparticles can further improve the contrast ratio and luminance while improving the optical characteristics of the resin layers.

In an embodiment, the acicular microparticles subjected to surface modification may have an index of refraction of 1.5 to 2.2, and, in an embodiment, 1.6 to 1.8, and, in an embodiment, 1.65 to 1.7. Within this range, the acicular microparticles can have a suitable index of refraction with respect to the matrix, thereby assisting in improvement in contrast ratio and visibility.

In an embodiment, the acicular microparticles may be present in an amount of 1 wt % to 30 wt %, and, in an embodiment, 4 wt % to 15 wt %, in the non-patterned contrast ratio-enhancing layer 320. Within this range, the acicular microparticles can secure improvement in contrast ratio and luminance of the liquid crystal display apparatus according to the present invention. By contrast, an excess of the acicular microparticles can provide high haze.

The optically anisotropic material may be embedded in the matrix.

The matrix contains the optically anisotropic material to be embedded therein such that the optically anisotropic material can stably provide the effect of improving the contrast ratio and visibility.

The matrix may have a higher or lower index of refraction than the optically anisotropic material.

In an embodiment, the matrix may have a higher index of refraction than the optically anisotropic material and may have an index of refraction of 1.5 or more, and, in an embodiment, 1.65 to 1.7. Within this range, the matrix can easily achieve the aforementioned difference in index of refraction.

In another embodiment, the matrix may have a lower index of refraction than the optically anisotropic material and may have an index of refraction of 1.2 or more, and, in an embodiment, 1.4 to 1.60, and, in an embodiment, 1.43 to 1.59. Within this range, the matrix can easily achieve the aforementioned difference in index of refraction.

The matrix may be a bonding layer or adhesive layer having bonding or adhesive properties. In this case, the non-patterned contrast ratio-enhancing layer may be directly stacked on the polarizer, thereby providing an effect of reducing the thickness of the polarizing plate. In an embodi-ment, the matrix is formed of a pressure-sensitive adhesive (PSA). In another embodiment, the matrix may be a non-bonding layer or non-adhesive layer not having bonding or adhesive properties.

The matrix may be formed of a composition including a UV curable resin and/or a heat curable resin. For example, the matrix may be formed of a composition including a resin, such as a (meth)acrylic resin, a urethane resin, an epoxy resin, a silicone resin, a urethane (meth)acrylate resin, an epoxy (meth)acrylate resin, and the like. The composition may further include a photoinitiator, a heat curing agent, and various additives. In an embodiment, the matrix may be formed of a pressure-sensitive adhesive (PSA) to form an adhesive layer, whereby the matrix can be directly stacked on the polarizer.

Light Source-Side Polarizing Plate

The light source-side polarizing plate 600 may include a polarizer and a protective layer stacked on at least one surface of the polarizer. The polarizer may be substantially the same as the polarizer described above in the viewer-side polarizing plate 200; 300. The protective layer may be substantially the same as the first protective layer 230; 330 described above in the viewer-side polarizing plate 200; 300.

Although not shown in FIG. 1, a reflective prism, a diffusive sheet, and the like may be further stacked between the light source-side polarizing plate 600 and the first optical sheet 400 to improve luminance.

Next, the present invention will be described in further detail with reference to some examples. However, it should be noted that these examples are provided for illustration only and should not be construed in any way as limiting the invention.

Example 1

(1) Manufacture of Viewer-Side Polarizing Plate

A polyethylene terephthalate (PET) film (TA-053, Toyobo Co., Ltd., Haze: 0.6%, No antireflection layer) was prepared. A composition for a second resin layer was coated to a predetermined thickness on a lower surface of the PET film to form a coating layer, and optical patterns and flat sections were formed on the coating layer to form the second resin layer. A composition for a first resin layer was coated on one surface of the second resin layer having the optical patterns and the flat sections thereon, and was cured to form a first resin layer, thereby forming a patterned layer having speci-fications as listed in Table 1.

TABLE 1

| W3 | H3 | Aspect ratio | θ | P | Cross-section | Difference in index of refraction |
|---|---|---|---|---|---|---|
| 8.9 μm | 10.4 μm | 1.17 | 81° | 13.7 μm | Trapezoidal | 0.15 |

A polarizer (thickness: 17 μm) was prepared by stretching a polyvinyl alcohol film to 3 times an initial length thereof at 60° C. in the machine direction thereof and dyeing the film with iodine, followed by stretching the dyed film to 2.5 times in an aqueous solution of boric acid at 40° C. in the machine direction thereof.

The patterned layer was attached to an upper surface of the prepared polarizer such that the first resin layer and the second resin layer could be sequentially stacked in the stated order from the polarizer, and a cyclic olefin polymer (COP) film (ZEON) was bonded to a lower surface of the polarizer, thereby preparing a polarizing plate having a stacking sequence of the PET film/patterned layer (index of refraction of the second resin layer: 1.62, index of refraction of the first resin layer: 1.47)/polarizer/COP film.

(2) Preparation of Light Source-Side Polarizing Plate

A polarizer and a polarizing plate having a stacking sequence of the PET film/polarizer/COP film were sequen-tially prepared with reference to (1).

(3) Preparation of First Optical Sheet and Second Optical Sheet

A composition for a first optical sheet or a composition for a second optical sheet were coated to a predetermined thickness on one surface of a polyethylene terephthalate (PET) film (T910E, thickness: 125 μm, Mitsubishi Co., Ltd.) used as a base layer. A prism pattern was formed on the coating layer, which in turn was cured, thereby preparing a first optical sheet and a second optical sheet each having specifications of Table 2.

(4) Preparation of Module for Liquid Crystal Display

A module was manufactured by attaching a viewer-side polarizing plate and a light source-side polarizing plate to a light exit surface and a light incidence surface of a liquid crystal panel having a liquid crystal layer (VA liquid crystals), respectively, followed by sequentially stacking the first optical sheet and the second optical sheet on a light incidence surface of the light source-side polarizing plate.

Examples 2 to 8

Modules were manufactured in the same manner as in Example 1 except that components of the modules were changed as listed in Table 2.

Example 9

A module was manufactured in the same manner as in Example 1 except that an optically anisotropic particle-containing layer was formed instead of the patterned layer as the contrast ratio-enhancing layer and a viewer-side polarizing plate having a stacking sequence of the optically anisotropic particles-containing layer/PET film/polarizer/COP film was prepared.

Preparation of Optically Anisotropic Particles-Containing Layer

A polyethylene terephthalate (PET) film (TA-053, Haze: 0.6%, No antireflection layer, Toyobo Co., Ltd.) was prepared.

A compound containing zinc oxide wires (aspect ratio of zinc oxide wire: 90, diameter of zinc oxide wire: 0.7 μm) was mixed with an acrylic pressure-sensitive composition to prepare a composition for a contrast ratio-enhancing layer containing optically anisotropic particles.

An optically anisotropic particles-containing layer (index of refraction: 1.48) including a matrix (index of refraction: 1.47) and zinc oxide wires (index of refraction: 2.0) was formed on a lower surface of a PET film by coating the composition on the lower surface of the PET film in one direction, followed by drying the composition.

Comparative Example 1

A module was manufactured in the same manner as in Example 1 except that a polarizing plate having a stacking sequence of a PET film/polarizer/COP film was used as a viewer-side polarizing plate without the contrast ratio-enhancing layer.

Comparative Examples 2 and 3

A module was manufactured in the same manner as in Example 1 except that the angle was changed.

Each of the modules prepared in the Examples and Comparative Examples was evaluated as to the properties listed in Table 2 and evaluation results are shown in Table 2.

(1) Right and left viewing angles: Luminance of a liquid crystal display apparatus in a white mode (luminance of 255 gray scale) was measured in the spherical coordinate system ($\phi=0°$, 180°, $\theta=0°$ to 88°) using an EZCONTRAST X88RC (EZXL-176R-F422A4, ELDIM). 50% viewing angle was calculated by summing angles $\theta$, at which 50% or more of front luminance was maintained, at each of $\phi=0°$ (right) and $\phi=180°$ (left). A viewing angle of 80° or more was rated as ⊚, a viewing angle of 70° to less than 80° was rated as ○, and a viewing angle of less than 70° was rated as X.

(2) Black visibility: Luminance in a white mode (luminance of 255 gray scale) and in a black mode (luminance of 0 gray scale) was measured at each of the front side ($\phi=0°$, $\theta=0°$) and lateral sides ($\phi=0°$, $\theta=60°$) in the spherical coordinate system using an EZCONTRAST X88RC (EZXL-176R-F422A4, ELDIM). A front contrast ratio and a lateral contrast ratio were calculated according to equations: front contrast ratio=(front luminance in white mode)/(front luminance in black mode) and lateral contrast ratio=(lateral luminance in white mode)/(lateral luminance in black mode), and black visibility was evaluated according to equation: black visibility=front contrast ratio x lateral contrast ratio. A black visibility of $2.0\times10^6$ or more was rated as ⊚, a black visibility of $1.0\times10^6$ to less than $2.0\times10^6$ was rated as ○, and a black visibility of less than $1.0\times10^6$ was rated as X.

TABLE 2

| | | Example | | | | | |
|---|---|---|---|---|---|---|---|
| | | 1 | 2 | 3 | 4 | 5 | 6 |
| Contrast ratio-enhancing layer | | Pattern | Pattern | Pattern | Pattern | Pattern | Pattern |
| First optical sheet | W1(μm) | 71.3 | 71.3 | 71.3 | 100.1 | 42.3 | 71.3 |
| | H1(μm) | 37.6 | 37.6 | 37.6 | 35.2 | 36.4 | 37.6 |
| | α(°) | 90 | 90 | 90 | 70 | 120 | 90 |
| Second optical sheet | W2(μm) | 70.9 | 70.9 | 70.9 | 70.9 | 70.9 | 100. |
| | H2(μm) | 37.2 | 37.2 | 37.2 | 37.2 | 37.2 | 35.2 |
| | β(°) | 90 | 90 | 90 | 90 | 90 | 70 |
| Angle | A(°) | 0 | −10 | 10 | 0 | 0 | 0 |
| | B(°) | 90 | 80 | 100 | 90 | 90 | 90 |
| | C(°) | 0 | 0 | 0 | 0 | 0 | 0 |
| | D(°) | 0 | −10 | 10 | 0 | 0 | 0 |
| Right and left viewing | 50% viewing angle | 87.7° | 80.6° | 80.1° | 72.5° | 91.2° | 75.8° |

TABLE 2-continued

| | | | | | | | |
|---|---|---|---|---|---|---|---|
| angle | Determination | ◎ | ○ | ○ | ○ | ◎ | ○ |
| Black | Front CR | 3649 | 3281 | 3197 | 3089 | 2632 | 3302 |
| visibility | Lateral CR | 628 | 430 | 422 | 411 | 505 | 451 |
| | Front CR × lateral CR | $2.29 \times 10^6$ | $1.41 \times 10^6$ | $1.35 \times 10^6$ | $1.27 \times 10^6$ | $1.33 \times 10^6$ | $1.49 \times 10^6$ |
| | Determination | ◎ | ○ | ○ | ○ | ○ | ○ |
| Final determination | | Good | Good | Good | Good | Good | Good |

| | | Example | | | Comparative Example | | |
|---|---|---|---|---|---|---|---|
| | | 7 | 8 | 9 | 1 | 2 | 3 |
| Contrast ratio-enhancing layer | | Pattern | Pattern | Aniso-tropic particle | — | Pattern | Pattern |
| First optical sheet | W1(μm) | 71.3 | 71.3 | 71.3 | 71.3 | 71.3 | 71.3 |
| | H1(μm) | 37.6 | 37.6 | 37.6 | 37.6 | 37.6 | 37.6 |
| | α(°) | 90 | 90 | 90 | 90 | 90 | 90 |
| Second optical sheet | W2(μm) | 42.3 | 70.9 | 70.9 | 70.9 | 70.9 | 70.9 |
| | H2(μm) | 36.4 | 37.2 | 37.2 | 37.2 | 37.2 | 37.2 |
| | β(°) | 120 | 90 | 90 | 90 | 90 | 90 |
| Angle | A(°) | 0 | 0 | 0 | 0 | 90 | 15 |
| | B(°) | 90 | 90 | 90 | 90 | 0 | 105 |
| | C(°) | 0 | 0 | 0 | — | 0 | 0 |
| | D(°) | 0 | 90 | 0 | 0 | 0 | 0 |
| Right and left viewing angle | 50% viewing angle | 89.6° | 87.8° | 71.6° | 60.7° | 88.4° | 76.9° |
| angle | Determination | ◎ | ◎ | ○ | X | ◎ | ○ |
| Black | Front CR | 2891 | 3611 | 5311 | 7132 | 1770 | 3183 |
| visibility | Lateral CR | 539 | 623 | 436 | 363 | 340 | 265 |
| | Front CR × lateral CR | $1.56 \times 10^6$ | $2.25 \times 10^6$ | $2.32 \times 10^6$ | $2.59 \times 10^6$ | $6.02 \times 10^5$ | $8.43 \times 10^5$ |
| | Determination | ○ | ◎ | ◎ | ◎ | X | X |
| Final determination | | Good | Good | Good | Good | Poor | Poor |

*In Table 2,

Angle (A): Angle of the longitudinal direction of the first optical patterns relative to the vertical direction of the liquid crystal panel Angle (B): Angle of the longitudinal direction of the second optical patterns relative to the vertical direction of the liquid crystal panel Angle (C): Angle of the longitudinal direction of the engraved optical patterns or the alignment direction of the optically anisotropic particles relative to the vertical direction of the liquid crystal panel Angle (D): Angle of the longitudinal direction of the first optical patterns relative to the light absorption axis of the viewer-side polarizer As shown in Table 2, the liquid crystal display apparatuses according to the present invention could improve black visibility and external appearance in the dark operation state while improving lateral viewing angles, particularly, right and left viewing angles, in the bright operation state.

By contrast, the liquid crystal display apparatuses of the Comparative Examples failing to satisfy the conditions of the present invention exhibited poor visibility due to poor right and left viewing angles and insufficient black visibility.

While some embodiments have been described herein, it is to be understood that various modifications, changes, alterations, and equivalent embodiments may be made by those skilled in the art without departing from the spirit and scope of the invention.

What is claimed is:

1. A liquid crystal display apparatus comprising: a liquid crystal panel; a viewer-side polarizing plate stacked on a light exit surface of the liquid crystal panel; and a first optical sheet and a second optical sheet sequentially stacked on a light incidence surface of the liquid crystal panel such that the first optical sheet is between the second optical sheet and the light incidence surface of the liquid crystal panel, wherein the viewer-side polarizing plate comprises a polarizer and a contrast ratio or viewing angle-enhancing layer, the liquid crystal panel has a horizontal direction corresponding to a long side thereof and a vertical direction corresponding to a short side thereof, the first optical sheet has a plurality of first optical patterns on a light exit surface thereof, an angle of a longitudinal direction of the first optical patterns relative to the vertical direction of the liquid crystal panel being from −10° to +10°, an angle of the longitudinal direction of the first optical patterns relative to a light absorption axis of the polarizer is from −10° to 10° or from 80° to 100°, the first optical patterns have a height of 30 μm to 50 μm, a width of 40 μm to 150 μm, and an aspect ratio of 0.3 to 0.9, the second optical sheet has a plurality of second optical patterns on a light exit surface thereof, and the second optical patterns have a width of 40 μm to 150 μm, a height of 30 μm to 50 μm, and an aspect ratio of 0.3 to 0.9;

wherein the contrast ratio or viewing angle-enhancing layer comprises a non-patterned contrast ratio-enhancing layer, the non-patterned contrast ratio-enhancing layer comprises a single layer comprising a matrix; and optically anisotropic materials aligned in the matrix, and a difference in index of refraction between the optically anisotropic materials and the matrix is 0.15 to 0.25.

2. The liquid crystal display apparatus according to claim 1, wherein the first optical sheet is a sheet collecting lights of left and right directions corresponding to the horizontal direction, and the second optical sheet is a sheet collecting lights of upward and downward directions corresponding to the vertical direction.

3. The liquid crystal display apparatus according to claim 1, wherein an angle of a longitudinal direction of the second optical patterns relative to the vertical direction of the liquid crystal panel is from 80° to 100°.

4. The liquid crystal display apparatus according to claim 3, wherein the first optical patterns have an apex angle of 70° to 120°, and the second optical patterns have an apex angle of 70° to 120°.

5. The liquid crystal display apparatus according to claim 3, wherein each of the first optical patterns and the second optical patterns has a stripe shape extending in the longitudinal direction thereof.

6. The liquid crystal display apparatus according to claim 1, wherein the angle of the longitudinal direction of the first optical patterns relative to the light absorption axis of the polarizer is from −10° to 10°.

7. The liquid crystal display apparatus according to claim 1, wherein the contrast ratio or viewing angle-enhancing layer further comprises a patterned contrast ratio-enhancing layer.

8. The liquid crystal display apparatus according to claim 7, wherein the patterned contrast ratio-enhancing layer comprises a first resin layer and a second resin layer having a different index of refraction relative to the first resin layer, and a patterned portion having at least one engraved optical pattern is formed at an interface between the first resin layer and the second resin layer.

9. The liquid crystal display apparatus according to claim 8, wherein an angle of a longitudinal direction of the engraved optical pattern relative to the vertical direction of the liquid crystal panel is from −10° to +10°.

10. The liquid crystal display apparatus according to claim 8, wherein the engraved optical pattern has a higher aspect ratio than the first optical patterns.

11. The liquid crystal display apparatus according to claim 8, wherein the engraved optical pattern has an aspect ratio of 0.3 or more.

12. The liquid crystal display apparatus according to claim 8, wherein the engraved optical pattern has a first surface at a top thereof and both lateral sides connected to the first surface and each of lateral sides having at least one flat surface or curved surface.

13. The liquid crystal display apparatus according to claim 8, wherein the patterned portion further comprises a flat section between adjacent engraved optical patterns.

14. The liquid crystal display apparatus according to claim 8, wherein a difference in index of refraction between the first resin layer and the second resin layer is 0.2 or less.

15. A liquid crystal display apparatus comprising: a liquid crystal panel; a viewer-side polarizing plate stacked on a light exit surface of the liquid crystal panel; and a first optical sheet and a second optical sheet sequentially stacked on a light incidence surface of the liquid crystal panel such that the first optical sheet is between the second optical sheet and the light incidence surface of the liquid crystal panel, wherein the viewer-side polarizing plate comprises a polarizer and a contrast ratio or viewing angle-enhancing layer, the liquid crystal panel has a horizontal direction corresponding to a long side thereof and a vertical direction corresponding to a short side thereof, the first optical sheet has a plurality of first optical patterns on a light exit surface thereof, an angle of a longitudinal direction of the first optical patterns relative to the vertical direction of the liquid crystal panel being from −10° to +10°, and an angle of the longitudinal direction of the first optical patterns relative to a light absorption axis of the polarizer is from −10° to 10° or from 80° to 100°, and wherein the contrast ratio or viewing angle-enhancing layer comprises a non-patterned contrast ratio-enhancing layer, the non-patterned contrast ratio-enhancing layer comprises a single layer comprising a matrix; and optically anisotropic materials aligned in the matrix, and a difference in index of refraction between the optically anisotropic materials and the matrix is 0.15 to 0.25.

16. The liquid crystal display apparatus according to claim 15, wherein an alignment angle of the optically anisotropic materials with respect to the vertical direction of the liquid crystal panel is from 65° to 115° or from −25° to 25°.

17. The liquid crystal display apparatus according to claim 15, wherein the optically anisotropic materials have a wire shape, a fiber shape, or an acicular shape.

18. The liquid crystal display apparatus according to claim 15, wherein the optically anisotropic materials comprise at least one selected from among wires formed of at least one selected from among a metal, a nonmetal, a metal oxide, a nonmetal oxide, a metal sulfide, a nonmetal sulfide, a metal nitride, a nonmetal nitride, a metal hydroxide, a nonmetal hydroxide, and glass, and acicular particles formed of at least one selected from among titanium oxide, zirconium oxide, zinc oxide, calcium carbonate, Boehmite, aluminum borate, calcium silicate, magnesium sulfate, magnesium sulfate hydrate, potassium titanate, glass, and a synthetic resin.

19. The liquid crystal display apparatus according to claim 1, wherein the viewer-side polarizing plate is free from at least one of an antireflection layer, a low-reflection layer, and an ultralow-reflection layer.

* * * * *